(12) United States Patent
Kito et al.

(10) Patent No.: US 11,802,623 B2
(45) Date of Patent: Oct. 31, 2023

(54) MECHANICAL SEAL

(71) Applicants: EAGLE INDUSTRY CO., LTD., Tokyo (JP); EAGLEBURGMANN JAPAN CO., LTD., Tokyo (JP)

(72) Inventors: Masakazu Kito, Tokyo (JP); Yoshiaki Takigahira, Tokyo (JP)

(73) Assignees: EAGLE INDUSTRY CO., LTD.; EAGLEBURGMANN JAPAN CO., LTD.

( * ) Notice: Subject to any disclaimer, the term of this patent is extended or adjusted under 35 U.S.C. 154(b) by 223 days.

(21) Appl. No.: 16/982,026

(22) PCT Filed: Apr. 2, 2019

(86) PCT No.: PCT/JP2019/014573
§ 371 (c)(1),
(2) Date: Sep. 17, 2020

(87) PCT Pub. No.: WO2019/194154
PCT Pub. Date: Oct. 10, 2019

(65) Prior Publication Data
US 2021/0018100 A1     Jan. 21, 2021

(30) Foreign Application Priority Data
Apr. 3, 2018 (JP) ................... 2018-071502

(51) Int. Cl.
*F16J 15/34* (2006.01)
(52) U.S. Cl.
CPC ................... *F16J 15/34* (2013.01)

(58) Field of Classification Search
CPC ...... F16B 2043/008; F16B 43/00; F16J 15/34
See application file for complete search history.

(56) References Cited

U.S. PATENT DOCUMENTS

| | | | | |
|---|---|---|---|---|
| 2,949,143 A | * | 8/1960 | Shur | F16B 41/002 411/353 |
| 3,062,253 A | * | 11/1962 | Miliheiser | F16B 5/0208 411/353 |

(Continued)

FOREIGN PATENT DOCUMENTS

| | | | |
|---|---|---|---|
| CN | 101021270 | 8/2007 | ............... F16J 15/16 |
| CN | 101131210 | 2/2008 | ............... F16J 15/53 |

(Continued)

OTHER PUBLICATIONS

First Office Action issued in Chinese Patent Appln. Serial No. 201980019474.1, dated Dec. 30, 2021, with English translation, 12 pages.

(Continued)

*Primary Examiner* — Vishal A Patel
(74) *Attorney, Agent, or Firm* — HAYES SOLOWAY P.C.

(57) ABSTRACT

A mechanical seal includes rotating seal ring which rotate with a rotary shaft, stationary seal rings, and an adaptor which holds the stationary seal rings 30, the adaptor 5 being fixed to a seal cover by bolts. The mechanical seal further includes a plurality of holders brought into contact with the adapter and provided with through holes. A body part of each of the bolts passes through each of the through holes and is screwed into each of threaded holes formed in the seal cover. The plurality of holders 9 being arranged so as to surround the rotary shaft.

6 Claims, 12 Drawing Sheets

(56) References Cited

U.S. PATENT DOCUMENTS

| | | | | |
|---|---|---|---|---|
| 3,218,906 A | * | 11/1965 | Dupree | F16B 41/002 |
| | | | | 411/533 |
| 3,743,302 A | * | 7/1973 | Bach | F16J 15/3464 |
| | | | | 277/366 |
| 6,935,632 B2 | * | 8/2005 | Azibert | F16J 15/3464 |
| | | | | 277/371 |
| 9,845,888 B2 | | 12/2017 | Furukawa et al. | F16J 15/3464 |
| 9,909,668 B2 | | 3/2018 | Jenisch et al. | F16J 15/3464 |
| 2004/0169336 A1 | | 9/2004 | Azibert et al. | F16J 15/34 |
| 2015/0184753 A1 | | 7/2015 | Yanagisawa et al. | F16J 15/34 |
| 2015/0184754 A1 | | 7/2015 | Furukawa et al. | F16J 15/3464 |

FOREIGN PATENT DOCUMENTS

| | | | | |
|---|---|---|---|---|
| CN | 101158361 | 4/2008 | | F04D 29/10 |
| CN | 101457841 | 6/2009 | | F16J 15/52 |
| CN | 103291930 | 9/2013 | | F16J 15/16 |
| CN | 104395655 | 3/2015 | | F16J 15/34 |
| CN | 205479358 | 8/2016 | | F16J 15/34 |
| DE | 10 2009 018 279 | 11/2009 | | F16B 31/00 |
| JP | 2006-519348 | 8/2006 | | F16J 15/34 |
| JP | 4684421 | 2/2011 | | F16J 15/34 |
| JP | 2017-25994 | 2/2017 | | F16B 5/02 |
| JP | 6196727 | 8/2017 | | F16J 15/34 |
| WO | WO 00/57090 | 9/2000 | | F16J 15/34 |
| WO | WO 2014/034582 | 3/2014 | | F16J 15/36 |

OTHER PUBLICATIONS

International Preliminary Report on Patentability issued in PCT/JP2019/014573, dated Oct. 6, 2020, English translation, 7 pages.

International Search Report and Written Opinion issued in PCT/JP2019/014573, dated Jul. 9, 2019, with English translation, 13 pages.

European Search Report issued in related European Patent Application Serial No. 19780777.9, dated Nov. 15, 2021 (7 pages).

* cited by examiner

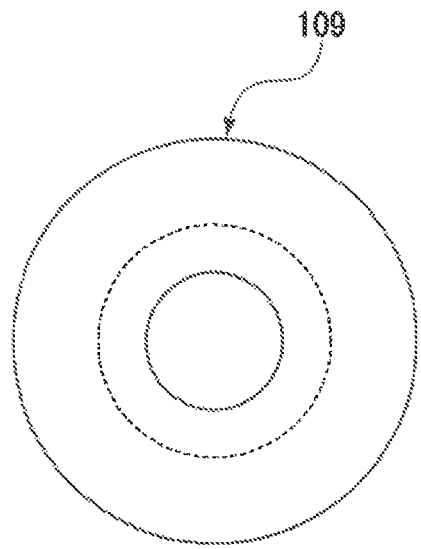
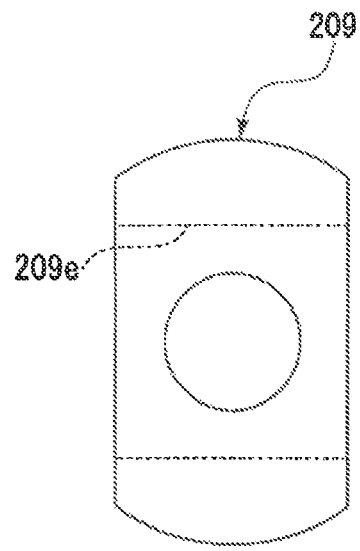
Fig. 6(a)
Fig. 6(b)
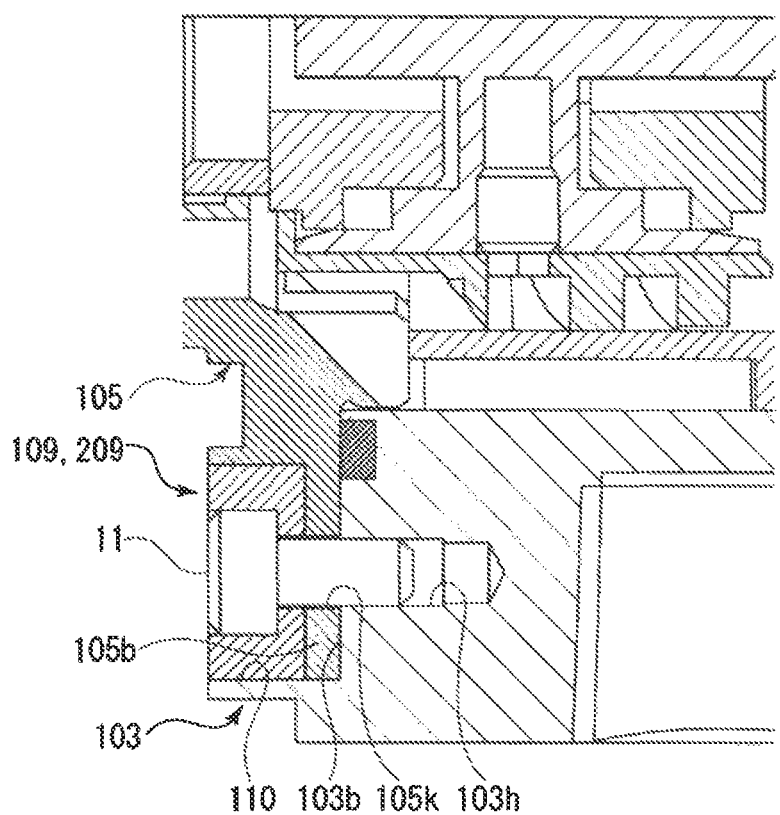
Fig. 6(c)

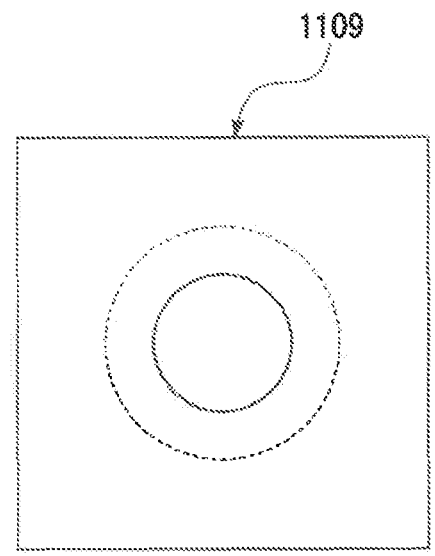
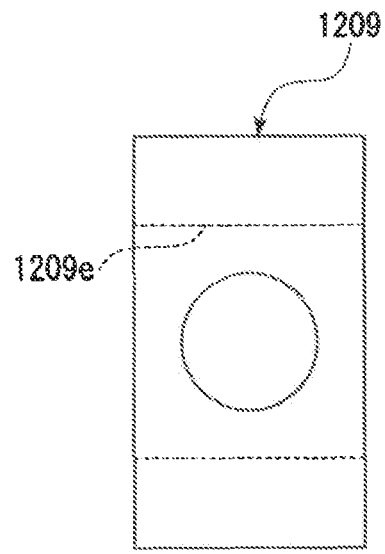
Fig. 11(a)　　Fig. 11(b)
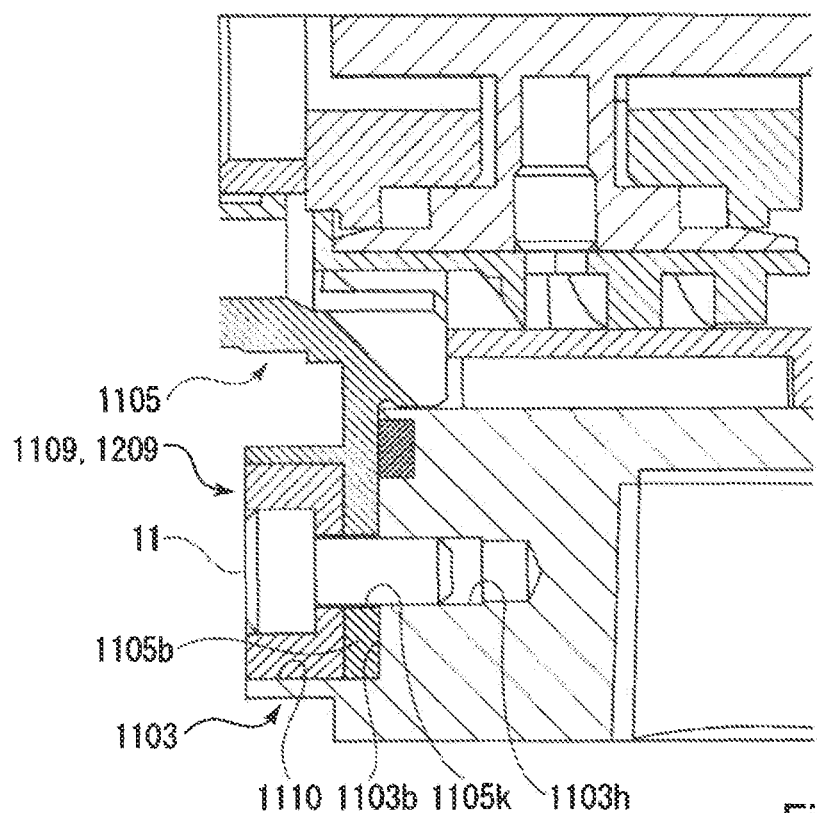
Fig. 11(c)

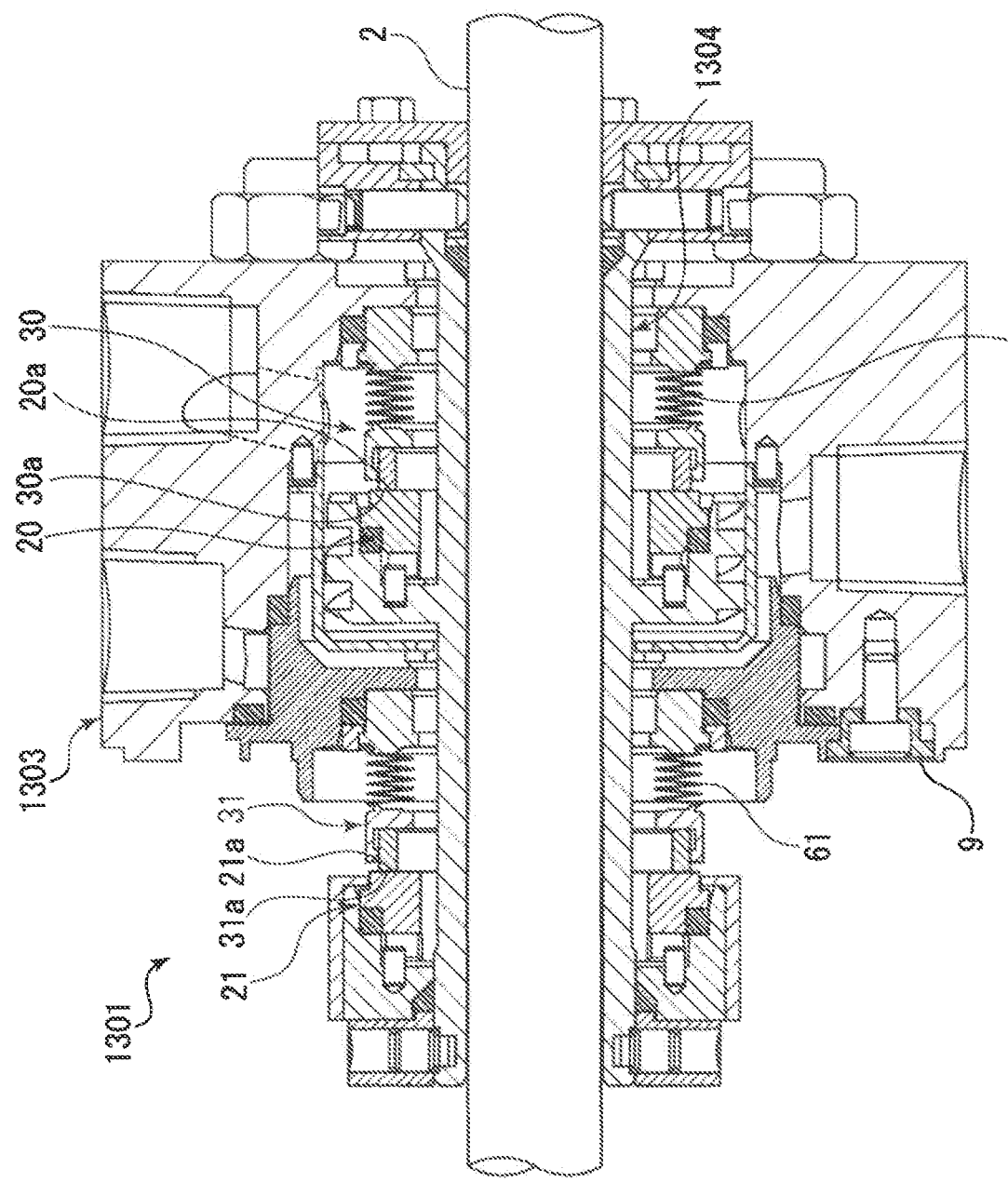

MECHANICAL SEAL

TECHNICAL FIELD

The present invention relates to a mechanical seal, and more particularly to a mechanical seal in which an adapter is fixed to a seal cover by bolts.

BACKGROUND ART

Conventionally, in a mechanical seal provided between a rotary shaft of rotating equipment such as a pump and a compressor, and a seal cover, a stationary seal ring is biased against a rotating seal ring fixed to the rotary shaft by biasing means to rotate sealing surfaces of the rotating seal ring and the stationary seal ring relatively to each other in close contact with each other, so that a sealed fluid is sealed. In addition, an adapter is used to fix the stationary seal ring to the seal cover, and with the stationary seal ring held by the adapter, the adapter is inserted into a recess in the seal cover in an axial direction to be fixed, facilitating assembling.

For example, in a mechanical seal described in Patent Citation 1, with an adapter having an O-ring attached at the outer periphery inserted into a recess of a seal cover in an axial direction, an annular thin plate is in contact with a side end of the adapter and a side end of the seal cover. Bolts with head parts extend in through holes of the annular thin plate, and are screwed into internally threaded portions extending in an axial direction of the seal cover to fix the annular thin plate to the seal cover, so that the adapter is positioned and fixed in the axial direction. However, since only the O-ring is interposed between an inner periphery of the seal cover and an outer periphery of the adapter, the adapter is likely to rotate relative to the seal cover, reducing the sealing performance.

Meanwhile, in a mechanical seal described in Patent Citation 2, after an O-ring is attached at an side end of a recess of a seal cover, with an adapter having an O-ring attached at the outer periphery inserted into the recess in the seal cover in an axial direction, flat head screws are screwed into the internally threaded portions extending in an axial direction of the seal cover, and the adapter is pushed in the axial direction by head parts of the flat head screws to be positioned and fixed with the O-ring at the side end of the recess in the seal cover in a collapsed state, increasing the sealing performance between the seal cover and the adapter while preventing the rotation of the adapter.

CITATION LIST

Patent Literature

Patent Citation 1: JP 4684421 B (page 4, FIGS. 1 to 4)
Patent Citation 2: JP 6196727 B (page 4, FIG. 2)

SUMMARY OF INVENTION

Technical Problem

However, in Patent Citation 2, the flat head screws are configured to be directly in contact with the adapter, and when a torque from the rotary shaft is applied to the adapter, the adapter rotates relative to the seal cover, and the torque is thus transmitted directly to the head parts of the flat head screws which are contact with the adapter. This results in that fact that the flat head screws are likely to be loosened.

The present invention has been made in view of such a problem, and an object of the present invention is to provide a mechanical seal in which a torque is less likely to be transmitted to bolts and which is capable of preventing the bolts from loosening.

Solution to Problem

In order to solve the problems described above, a mechanical seal according to the present invention includes: a rotating seal ring which rotate together with a rotary shaft; a stationary seal ring; an adapter which holds the stationary seal ring, the adapter being fixed to a seal cover by bolts; and a plurality of holders brought into contact with the adapter and provided with through holes, a body part of each of the bolts passing through each of the through holes and being screwed into each of threaded holes formed in the seal cover, the plurality of holders being arranged so as to surround the rotary shaft. According to the aforesaid feature, since the adapter is fixed to the seal cover by the bolts which pass through the through holes of the plurality of holders, the rotation of the adapter relative to the seal cover is prevented. Additionally, even when a torque is applied the adapter, the holder receives the torque, and therefore, the torque is less likely to be transmitted to the bolts, and the bolts can be prevented from loosening.

It may be preferable that the holders have inner flange portions formed around the through holes, bottom portions of head parts of the bolts being brought into contact with the inner flange portions. According to this preferable configuration, since the holders are pressed against and fixed to the seal cover with the inner flange portions interposed between the head parts of the bolts and the seal cover, the positioning accuracy of the holders in the axial direction is improved. and the holders can be firmly fixed to the seal cover.

It may be preferable that contact portions of the holders with the adapter are outer flange portions formed in the holders so as to extend radially outward. According to this preferable configuration, since the adapter is pressed against and fixed to the seal cover by the outer flange portions, the adapter can be firmly fixed to the seal cover.

It may be preferable that the holders are provided with receiving recesses for receiving the head parts of the bolts. According to this preferable configuration, an amount of the head parts of the bolts protruding outward of the holders is small, or the parts can be preventing from protruding outward of the holders.

It may be preferable that the seal cover is provided with receiving recesses for receiving the holders. According to this preferable configuration, an amount of the holders protruding outward of the seal cover is small, or the holders can be prevented from protruding outward of the seal cover.

It may be preferable that each of the holders and each of the receiving recesses in the seal cover are formed in a circular shape as viewed in a screw insertion direction of the bolts and are fitted to each other. According to this preferable configuration, installing and assembling the holders to the receiving recesses in the seal cover can be easily performed.

It may be preferable that each of the holders and each of the receiving recesses in the seal cover are formed in a non-circular shape as viewed in a screw insertion direction of the bolts and are fitted to each other. According to this preferable configuration, even when a torque is applied to the adapter with the holders fitted in the receiving recesses in the seal cover, the torque of the holders is regulated, so that no torque is transmitted to the bolts, and the bolts can be more reliably prevented from being loosening.

It may be preferable that the adapter has portions interposed between radially inner side parts of the outer flange portions and the seal cover, gaps are formed between radially outer side parts of the outer flange portions and the seal cover. According to this preferable configuration, when the bolts are tightened, the pressing force for pressing the adapter between the seal cover and the bolts can be concentrated on the radially inner sides of the outer flange portions of the holders.

It may be preferable that a squeeze packing is provided so as to be at least partially positioned between the holders and the seal cover in the screw insertion direction of the bolts. According to this preferable configuration, since the squeeze packing is compressed in the screw insertion direction of the bolts by the adapter pressed by the holders, the sealing performance is increased.

BRIEF DESCRIPTION OF DRAWINGS

FIGS. 6A and 6B are bottom views showing configurations of holders according to modifications A and B of the first embodiment, and FIG. 6C is an enlarged sectional view showing a configuration for fixing the adapter by the holders according to the modifications A and B.

FIGS. 11A and 11B are bottom views showing configurations of holders according to modifications K and M of the first embodiment, and FIG. 11C is an enlarged sectional view showing a configuration for fixing the adapter by the holders according to the modifications K and M.

FIG. 12 is a cross-sectional view showing a configuration of a mechanical seal according to a second embodiment of the present invention.

DESCRIPTION OF EMBODIMENTS

Figure 1:
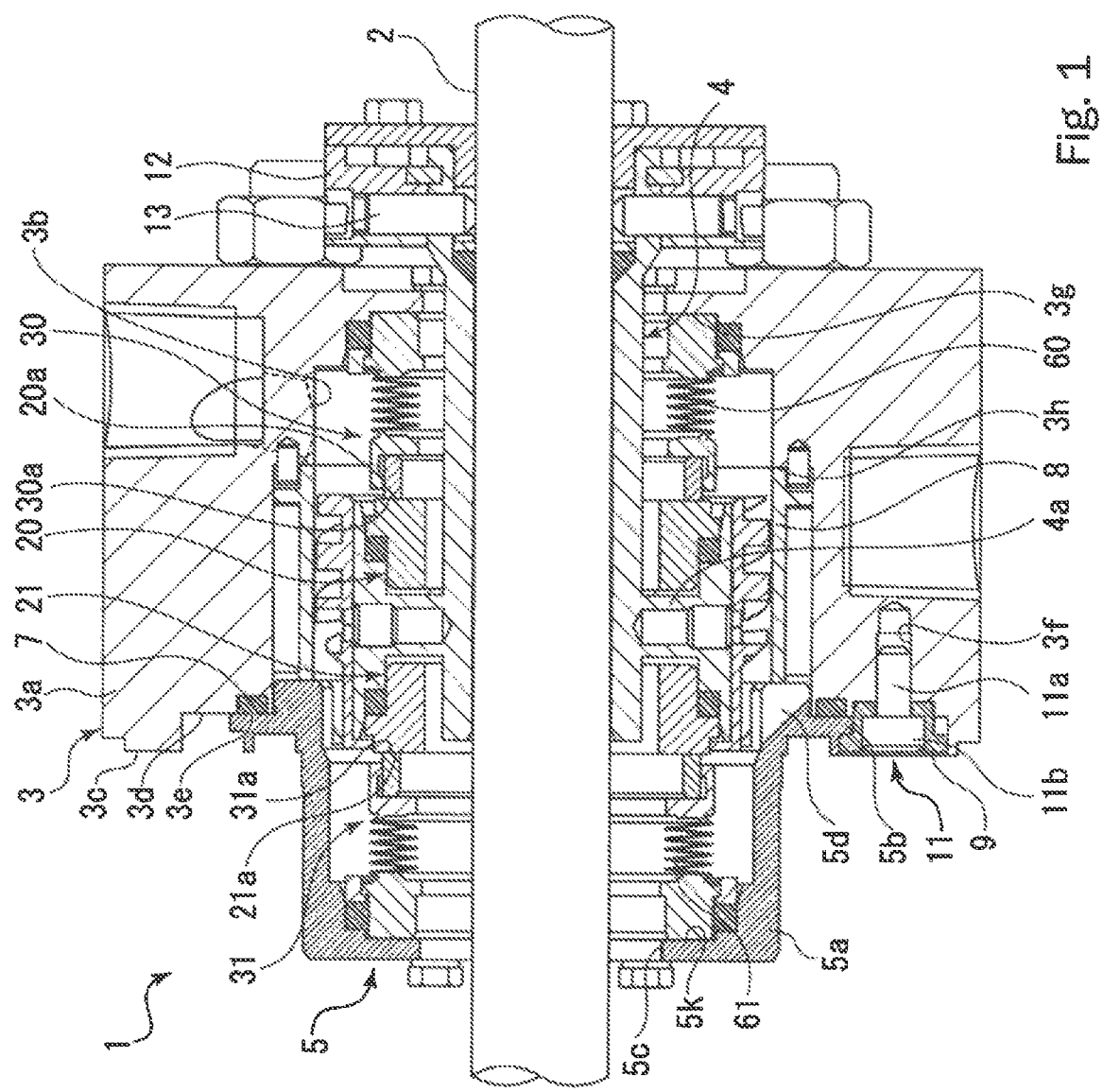
FIG. 1 is a cross-sectional view showing a configuration of a mechanical seal according to a first embodiment of the present invention.

Modes for implementing a mechanical seal according to the present invention will be described below based on embodiments.

First Embodiment

A mechanical seal according to a first embodiment of the present invention will be described with reference to FIGS. 1 to 5. In the present embodiment, the right side of the drawing will be described as an atmosphere side, and the left side of the drawing will be described as an equipment interior side.

As shown in FIG. 1, a mechanical seal 1 according to the present embodiment is provided between a rotary shaft 2 of rotating equipment such as a pump and a compressor, and a seal cover 3, and mainly includes annular rotating seal rings 20, 21 fixed to the rotary shaft 2 via a sleeve 4, annular stationary seal rings 30, 31 fixed to the seal cover 3, and an adapter 5. The stationary seal rings 30, 31 are, respectively, biased in an axial direction by metal bellows members 60, 61, so that sliding surfaces 20a, 21a of the rotating seal rings 20, 21 and sliding surfaces 30a, 31a of the stationary seal rings 30, 31 closely slide with each other to allow a sealed fluid in the interior of the equipment to be sealed. The mechanical seal 1 according to the present embodiment is configured as a so-called double mechanical seal in which the rotating seal ring 20 and the stationary seal ring 30 on the atmosphere side, and the rotating seal ring 21 and the stationary seal ring 31 on the equipment interior side face in opposite directions.

The rotating seal rings 20, 21 and the stationary seal rings 30, 31 are typically formed of a combination of SiC (hard material) or a combination of SiC (as an example of hard material) and carbon (as an example of soft material), but are not limited thereto. Any sliding material is applicable as long as it is used as a sliding material for mechanical seal. Further, the SiC includes a sintered compact with boron, aluminum, carbon or the like as sintering aids, as well as a material composed of two or more phases having different components and compositions, for example, SiC in which graphite particles are dispersed, reaction-sintered SiC composed of SiC and Si, SiC—TiC, SiC—TiN, and the like. As carbon, carbon in which a carbonaceous material and a graphite material are mixed, as well as resin-molded carbon, sintered carbon, and the like, can be used. Other than the sliding materials described above, metal materials, resin materials, surface modification materials (as examples of coating materials), composite materials, and the like are also applicable.

As shown in FIG. 1, the seal cover 3 is made of stainless steel and is formed in a substantially cylindrical shape. A through hole 3b, through which the rotary shaft 2 and the sleeve 4 can extend, is formed in the interior of the cylindrical portion 3a. On the radially inner side of the seal cover 3, a first annular attachment portion 3g is formed on the atmosphere side, to which one end of the bellows member 60 is fixed, and a second annular attachment portion 3h is formed on the equipment interior side and radially outer side of the first annular attachment portion 3g, to which a cylindrical baffle 8 with a flange is attached. Thus, the interior of the seal cover 3 is formed in a stepped shape.

Figure 2:
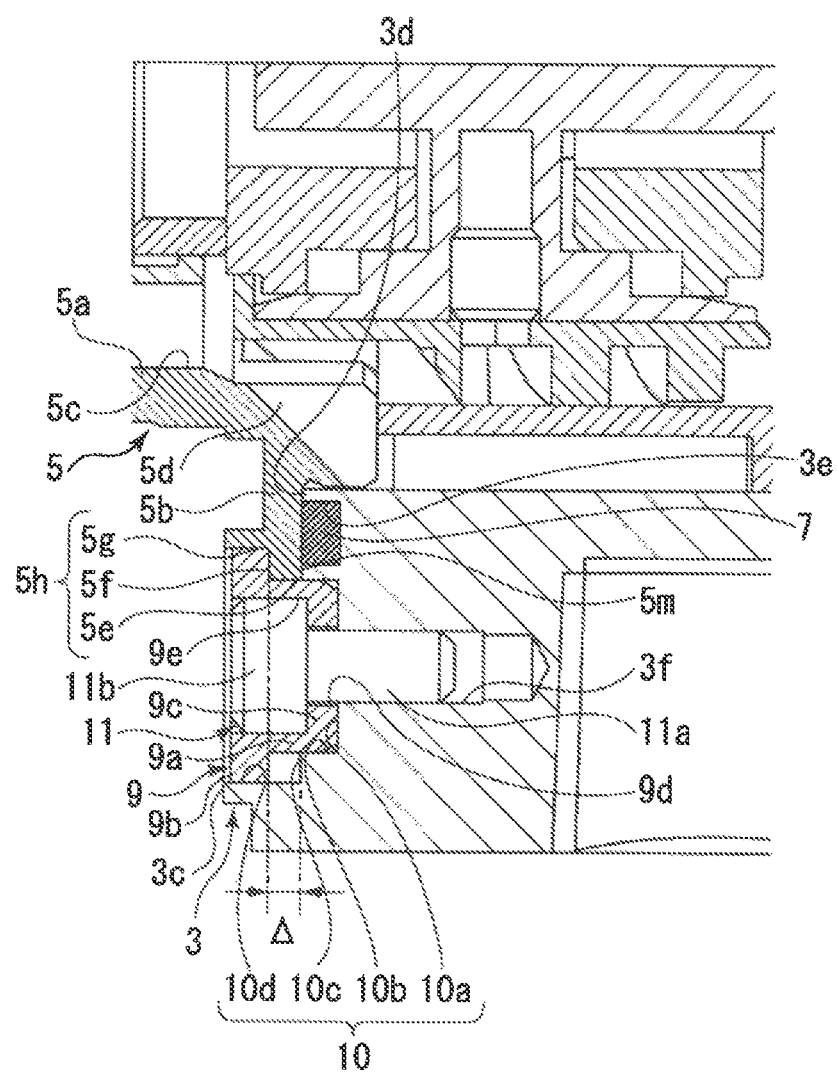
FIG. 2 is an enlarged sectional view showing a configuration for fixing an adapter by holders according to the first embodiment.

As shown in FIGS. 1 and 2, in an end face portion 3c on the equipment interior side of the cylindrical portion 3a, an annular recess 3d is provided, which is recessed toward the atmosphere side around the through hole 3b. On the radially inner side of an axially extending bottom surface of the annular recess 3d, an annular groove portion 3e is provided, into which an annular squeeze packing 7 is inserted and fitted. The squeeze packing 7 may be made of an elastic material, and the material may be rubber, resin, graphite or the like. On the radially outer side of the axially extending bottom surface of the annular recess 3d, that is, on the radially outer side of the annular groove portion 3e, internally threaded holes 3f as threaded holes extending in the axial direction toward the atmosphere side are provided. Into the internally threaded holes 3f, body parts 11a of bolts 11 for fixing the adapter 5 to the seal cover 3 are screwed.

Figure 3:
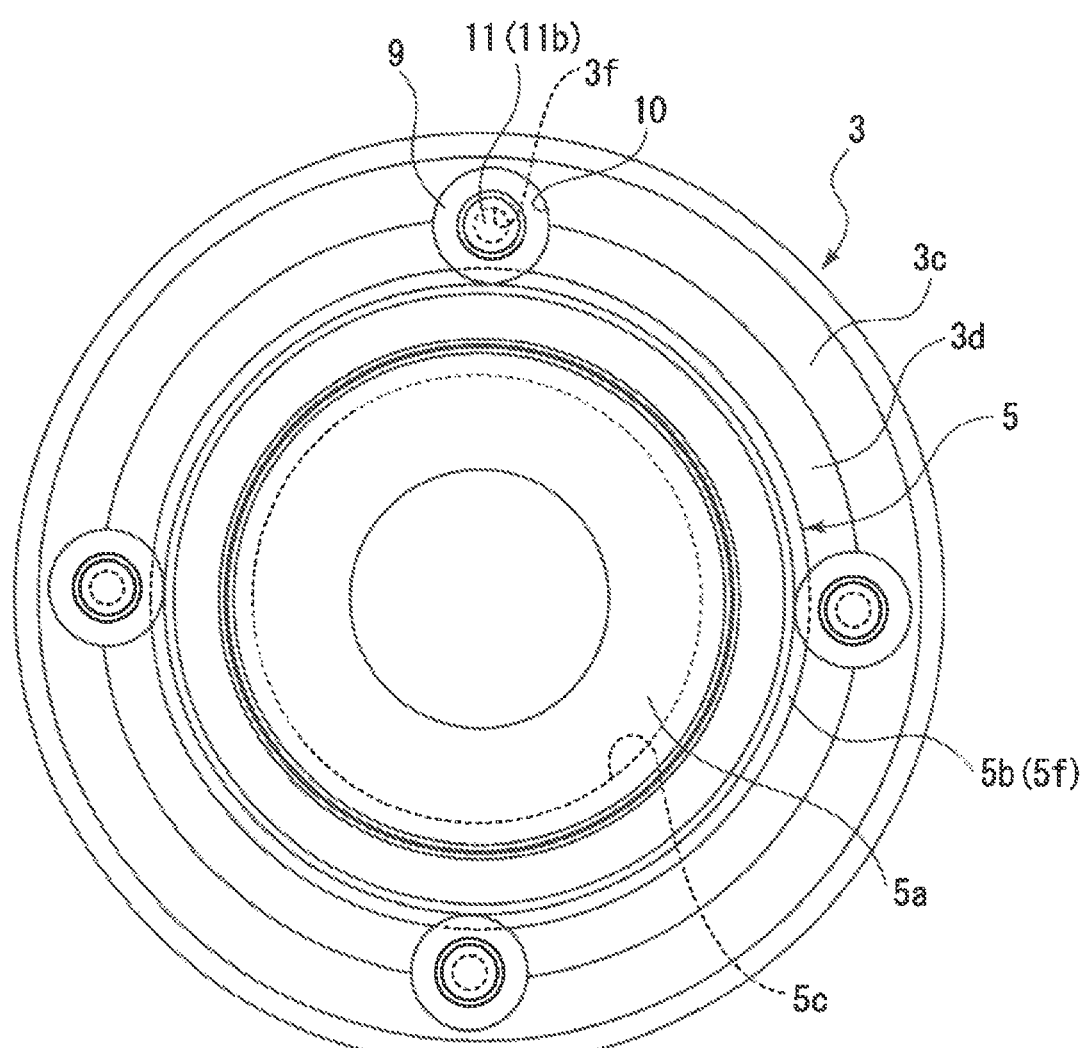
FIG. 3 is a plan view showing the configuration for fixing the adapter by the holders according to the first embodiment as viewed from an equipment interior side.
Figure 4A:
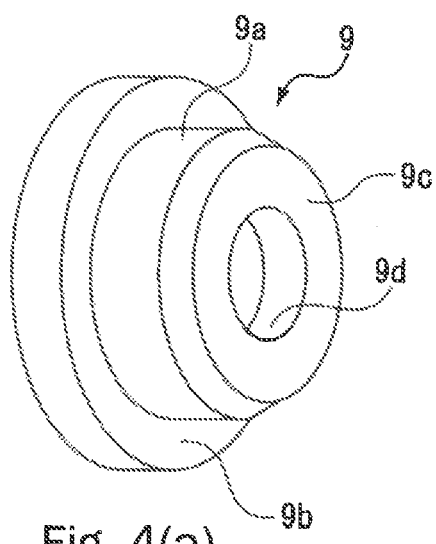
FIGS. 4A and 4B are perspective views showing a configuration of the holders according to the first embodiment.
Figure 4B:
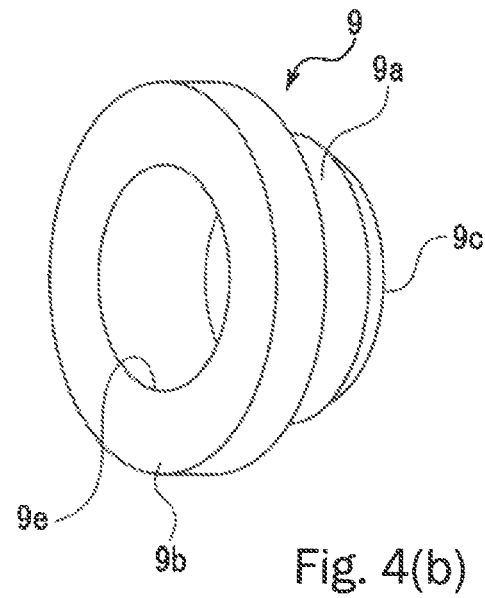
Figure 4C:
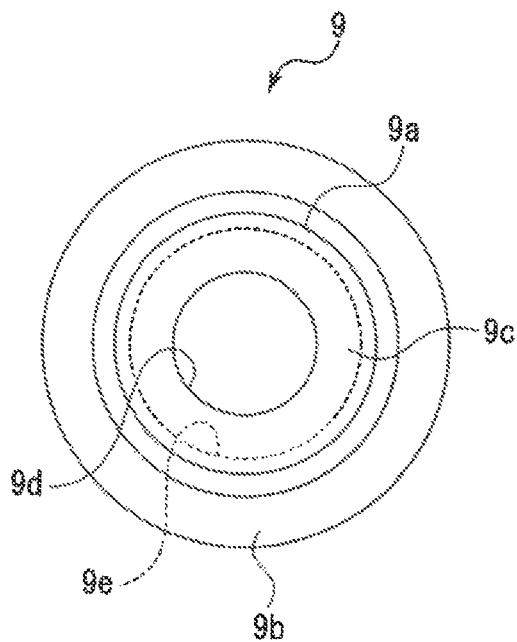
FIG. 4C is a bottom view showing the same.

As shown in FIG. 2 and FIG. 3, in the end face portion 3c on the equipment interior side of the cylindrical portion 3a, receiving recesses 10, that is, so-called counterbore holes, are formed, into which holders 9 are inserted and fitted around the internally threaded holes 3f. The receiving recesses 10 are each defined by an annular bottom surface portion 10a continuous radially outward perpendicularly from an opening end of the internally threaded hole 3f, that is, an equipment interior side end thereof, a first side surface portion 10b extending toward the equipment interior side from an radially outer side end of the bottom surface portion 10a, an outer edge surface portion 10c extending in a direction perpendicular to and continuously from an equipment interior side end of the radially outer side of the first side surface portion 10b, and a second side surface portion 10d extending from a radially outer side end of the outer edge surface portion 10c toward the equipment interior side. Thus, the receiving recesses 10 are configured as stepped cylindrical spaces. Further, the radially inner side of the equipment interior side end of the first side surface portion 10b on, that is, the side of the through hole 3b thereof, is continuous perpendicularly to a radially extending bottom surface of the annular recess 3d on the radially inner side thereof. The four receiving recesses 10 are equiangularly arranged in a circumferential direction of the seal cover 3 together with the four internally threaded holes 3f (see particularly FIG. 3).

As shown in FIG. 1, the adapter 5 is made of stainless steel, is formed in a cylindrical shape with a flange, and includes a cylindrical portion 5a and an annular flange portion 5b extending radially outward at an atmosphere side end of the cylindrical portion 5a. A through hole 5c is formed in the interior side of the cylindrical portion 5a, through which the rotary shaft 2 can extend. On the radially inner side of the adapter 5, an annular attachment portion 5k is formed on the equipment interior side, to which one end of the bellows member 61 is fixed.

As shown in FIGS. 1 and 2, in an atmosphere side end of the adapter 5, an attachment portion 5d having a larger diameter than the cylindrical portion 5a is provided, and the size of an outer periphery of the attachment portion 5d is substantially equal to the size of an inner periphery of an opening end of the through hole 3b of the seal cover 3, that is, an equipment interior side end thereof. Further, in the radially outer portion of the flange portion 5b, an annular stepped portion 5h is formed by a first outer peripheral surface 5e on the atmosphere side, an annular surface portion 5f on the equipment interior side extending radially inward and continuous perpendicularly from an equipment interior side end of the first outer peripheral surface 5e, and a second outer peripheral surface 5g extending from an radially inner side end of the annular surface portion 5f toward the equipment interior side.

With the attachment portion 5d of the adapter 5 inserted and fitted into the through hole 3b of the seal cover 3, an annular surface portion 5m on the atmosphere side of the flange portion 5b of the adapter 5 is in contact with the radially extending bottom surface of the annular recess 3d of the seal cover 3. At this time, the annular step portion 5h formed on the radially outer portion of the flange portion 5b of the adapter 5, that is, the first outer peripheral surface 5e, is configured to be axially continuous with the first side surface portion 10b of the receiving recess 10 in the seal cover 3. Further, the axial position of the annular surface portion 5f on the equipment interior side constituting the annular step portion 5h of the adapter 5 is closer to the equipment interior side by the gap Δ than that of the outer edge surface portion 10c on the radially outer side constituting the receiving recess 10 in the seal cover 3.

Next, the holders 9 will be described in detail. As shown in FIGS. 1 to 4, the holders 9 are made of stainless steel and are formed in a cylindrical shape with a flange. The holders 9 each include a cylindrical portion 9a and an annular flange portion 9b as an outer flange portion and a contact portion extending radially outward at an equipment interior side end of the cylindrical portion 9a. At the radially center of a bottom portion 9c as an inner flange portion on the atmosphere side of the cylindrical portion 9a, that is, on the side of the seal cover 3 thereof, a through hole 9d is formed to extend therethrough in the axial direction. Further, the holders 9 are inserted and fitted into the receiving recesses 10 in the seal cover 3, so that with the body parts 11a of the bolts 11 inserted into the through holes 9d and with the bolts 11 held, the body parts 11a of the bolts 11 can be screwed into the internally threaded holes 3f of the seal cover 3.

The holders 9 each have a receiving recess 9e formed by the cylindrical portion 9a and an equipment interior side end surface of the bottom portion 9c, and the receiving recesses 9e can receive head parts 11b of the bolts 11. Further, the diameter of the head parts 11b of the bolts 11 is larger than the diameter of the body parts 11a, and the diameter of the receiving recesses 9e is larger than the diameter of the through holes 9d. Therefore, with the bolts 11 held by the holders 9, the body parts 11a of the bolts 11 are screwed into the internally threaded holes 3f of the seal cover 3, so that atmosphere side end surfaces as bottom portions of the head parts 11b of the bolts 11 received in the receiving recess 9e can be axially pressed against equipment interior side end surfaces of the bottom portions 9c of the holders 9. Although the receiving recesses 9e of the holders 9 are formed as cylindrical spaces, the shape thereof is not limited to this, and may be freely formed as long as the receiving recesses 9e can receive the head parts 11b of the bolts 11.

Further, since the flange portions 9b of the holders 9 on the radially inner side, that is, on the side of the through hole 3b extend to axially overlap with the annular stepped portion 5h of the adapter 5, the annular stepped portion 5h of the flange portion 5b of the adapter 5 can be interposed in the axial direction between the radially inner sides of the flange portions 9b of the holder 9 and the radially extending bottom surface of the annular recess 3d of the seal cover 3. At this time, the squeeze packing 7 disposed between the bottom portion of the annular recess 3d of the seal cover 3, that is, the annular groove portion 3e, and the flange portion 5b of the adapter 5 is compressed in a screw insertion direction of the bolts 11.

Figure 5:
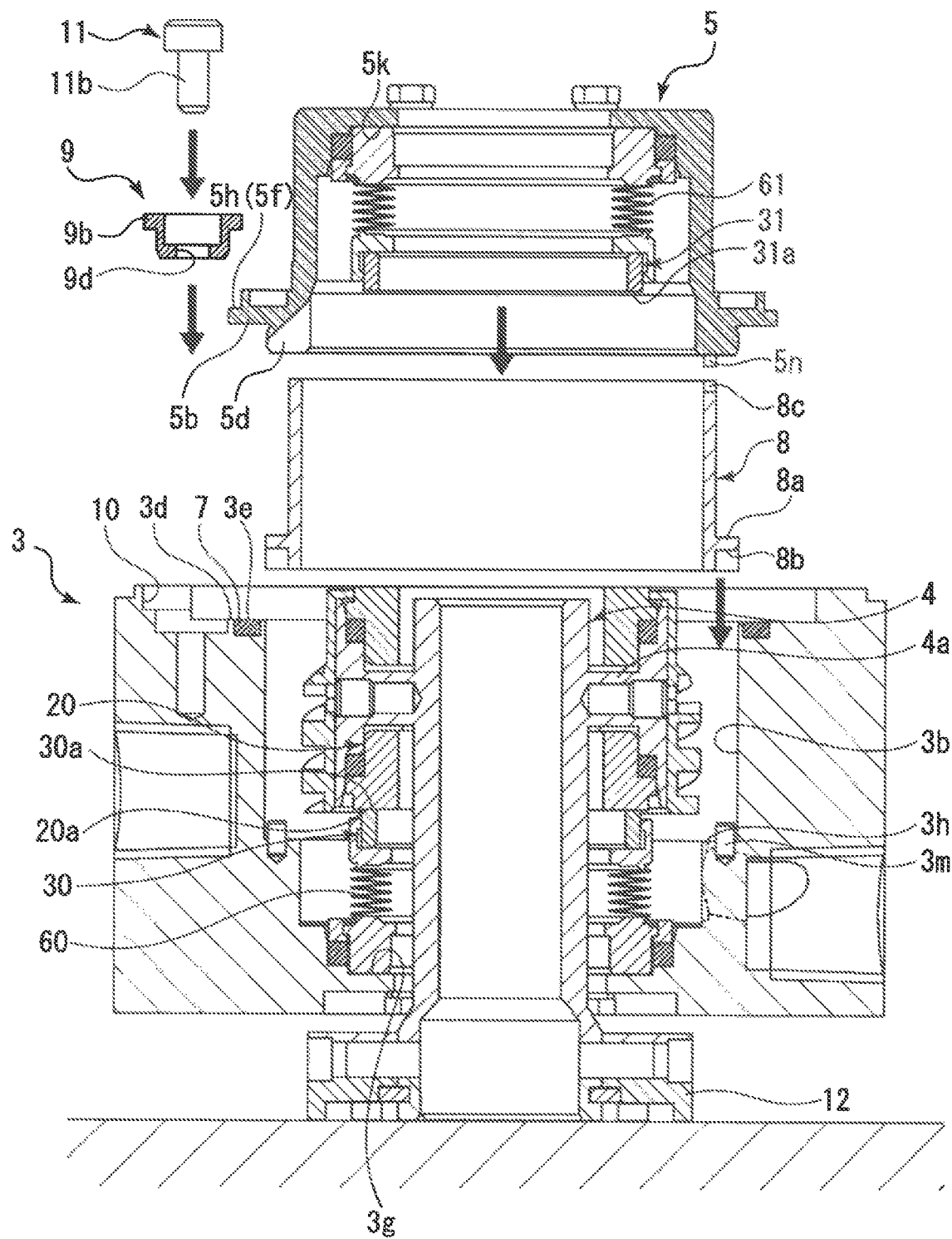
FIG. 5 is a view showing a procedure for attaching the adapter by the holders according to the first embodiment.

Next, a procedure for assembling the mechanical seal 1 will be described. As shown in FIG. 5, first, the bellows member 60 and the stationary seal ring 30 are fixed to the first annular attachment portion 3g of the seal cover 3, and the bellows member 61 and the stationary seal ring 31 are fixed to the annular attachment portion 5k of the adapter 5.

Next, the sleeve 4 is inserted into the through hole 3b of the seal cover 3 from the equipment interior side, and the sliding surface 20a of the rotating seal ring 20 fixed to a holding portion 4a of the sleeve 4 is brought into contact with the sliding surface 30a of the stationary seal ring 30. The squeeze packing 7 thinly coated with molybdenum disulfide grease is inserted and fitted into the annular groove portion 3e of the seal cover 3.

Next, the baffle 8 is inserted into a gap between the seal cover 3 and the sleeve 4 from the equipment interior side. At this time, a locking pin 3m provided in the second annular attachment portion 3h of the seal cover 3 is fitted into a notch 8b provided in the flange portion 8a of the baffle 8 to regulate the rotation of the baffle 8 relative to the seal cover 3.

Next, the attachment portion 5d of the adapter 5 is inserted and fitted into the through hole 3b of the seal cover 3, and the sliding surface 31a of the stationary seal ring 31 fixed to the adapter 5 is brought into contact with the sliding surface 21a of the rotating seal ring 21 fixed to the holding portion 4a of the sleeve 4. At this time, a locking pin 5n provided in the attachment portion 5d of the adapter 5 is inserted into a notch 8c provided at an equipment interior side end of the baffle 8 to regulate the rotation of the adapter 5 relative to the seal cover 3.

Finally, the holders 9 are inserted and fitted into the receiving recesses 10 in the seal cover 3 and the annular stepped portion 5h of the adapter 5, and with the body parts 11a of the bolts 11 inserted into the through holes 9d of the holders 9 and with the bolts 11 held by the holders 9, the body parts 11a of the bolts 11 are screwed into the internally threaded holes 3f of the cover 3, so that the adapter 5 is fixed to the seal cover 3.

A set ring 12 is externally fitted to an atmosphere side end of the sleeve 4 exposed from the through hole 3b of the seal cover 3. After assembling the mechanical seal 1, as shown in FIG. 1, the rotary shaft 2 is inserted into the sleeve 4. The set ring 12 is fastened evenly in the circumferential direction by a plurality of set screws 13, so that the mechanical seal 1 is attached to the rotary shaft 2.

Accordingly, in the mechanical seal 1 according to the present embodiment, since the adapter 5 is fixed to the seal cover 3 by the bolts 11 extending through the through holes 9d of the plurality of holders 9, the rotation of the adapter 5 relative to the seal cover 3 is prevented. In addition, even when a torque is applied to the adapter 5, the holders 9 receive the torque, so that the torque is less likely to be transmitted to the bolts 11, and the bolts 11 can be prevented from being loosened.

Further, since the holders 9 each have the bottom portion 9c around the through hole 9d, which is in contact with the atmosphere side end surface as a bottom portion of the head part 11b of the bolt 11, with the bottom portions 9c of the holders 9 interposed between the head parts 11b of the bolts 11 and the bottom surface portions 10a of the receiving recesses 10 in the seal cover 3, the holders 9 are pressed against and fixed to the seal cover 3. Therefore, the holders 9 can be firmly fixed to the seal cover 3.

Further, since the flange portion 5b of the adapter 5 is pressed against and fixed to the annular recess 3d of the seal cover 3 by the flange portions 9b of the holder 9 on the radially inner side, that is, on the side of the through hole 3b, the adapter 5 can be firmly fixed to the seal cover 3. In addition, when the bolts 11 are tightened until the bottom portions 9c of the holders 9 come into contact with the bottom surface portions 10a of the receiving recesses 10 in the seal cover 3, the position of the flange portions 9b of the holders 9 relative to the annular surface portion 5f on the equipment interior side of the flange portion 5b of the adapter is the predetermined tightening position, improving the positioning accuracy in the axial direction and facilitating assembling.

Furthermore, while the flange portion 5b of the adapter 5 is interposed between the radially inner sides of the flange portions 9b of the holders 9 and the radially extending bottom surface of the annular recess 3d of the seal cover 3, the axial gap Δ (see FIG. 2) is formed between the radially outer sides of the flange portions 9b of the holders 9 and the outer edge surface portions 10c of the receiving recesses 10 of the seal cover 3. Therefore, when the bolts 11 are tightened, the pressing force for pressing the holders 9 against the seal cover 3 and pressing the flange portion 5b of the adapter 5 between the holders 9 and the seal cover 3 can be concentrated on the radially inner sides of the flange portions 9b of the holders 9. The radially outer sides of the flange portions 9b of the holders 9 and the outer edge surface portions 10c of the receiving recesses 10 in the seal cover 3 may be in contact with each other in the axial direction, that is, the gap Δ may not be provided.

Further, since the squeeze packing 7 is arranged between the radially inner sides of the flange portions 9b of the holders 9 and the bottom portion of the annular recess 3d of the seal cover 3 in the screw insertion direction of the bolts 11, the squeeze packing 7 is compressed in the screw insertion direction of the bolts 11 by the flange portion 5b of the adapter 5 which receives the pressing force from the holders 9 when the bolts 11 are tightened, increasing the sealing performance. Thus, it is possible to configure a mechanical seal that seals a high-pressure sealed fluid, such as using the metal bellows members 60 and 61. In addition, since the squeeze packing 7 is interposed between the adapter 5 and the seal cover 3, the friction between the adapter 5 and the seal cover 3 increases, so that the rotation of the adapter 5 relative to the seal cover 3 can be prevented.

Further, since the holders 9 are provided with the receiving recesses 9e for receiving the head parts 11b of the bolts 11, the head parts 11b of the bolts 11 do not protrude outward, that is, on the equipment interior side of the holder 9, so that space saving can be achieved. In addition, the receiving recesses 9e of the holders 9 may be configured such that the head parts 11b of the bolts 11 slightly protrude outward, that is, on the equipment interior side of the holders 9.

Further, since the seal cover 3 is provided with the receiving recesses 10 for receiving the holders 9, the holders 9 do not protrude outward of the end face portion 3c on the equipment interior side of the seal cover 3, so that space saving can be achieved. In addition, the receiving recesses 10 in the seal cover 3 may be configured such that part of the holders 9 slightly protrudes outward, that is, on the equipment interior side of the end face portion 3c on the equipment interior side of the seal cover 3.

Further, the holders 9 are formed in a circular shape as viewed in the screw insertion direction, and the receiving recesses 10 in the seal cover 3 are formed in a substantially circular shape as viewed in the screw insertion direction, and with the holders 9 inserted and fitted into the receiving recesses 10 in the seal cover 3, the holders 9 are rotatable relative to the cover 3 and the adapter 5. Therefore, even when a torque is applied to the adapter 5, the holders 9 receive the torque to be easily rotated, and the torque is less likely to be transmitted to the bolts 11, so that the bolts 11 can be prevented from loosening. In addition, the holders 9 may be formed, for example, in a polygonal shape as viewed in the screw insertion direction as long as the holders 9 are rotatable while being inserted and fitted into the receiving recesses 10 in the seal cover 3. Furthermore, installing/assembling the holders 9 to the receiving recesses 10 in the seal cover 3 can be easily performed.

Further, since the respective holders 9 are provided in the plurality of receiving recesses 10 provided in the circumferential direction of the seal cover 3, a space in the circumferential direction between the holders 9 is provided, so that heat transfer from the equipment interior side can be prevented, as compared with a conventional annular thin plate continuous in the circumferential direction of the seal cover 3. In addition, since the seal cover 3, the adapter 5, and the holders 9 are made of the same stainless steel, stress due to thermal expansion is less likely to relatively act.

Next, a modification of the holders 9 according to the first embodiment will be described. As a modification A of the holders 9 according to the first embodiment, holders 109 shown in FIG. 6A are formed in a circular shape as viewed in the screw insertion direction without a flange portion extending radially outward. A seal cover 103 has an annular recess 103b formed up to the radially outer side. An adapter 105 has a flange portion 105b extending up to the radially outer portion of the annular recess 103b of the seal cover 103, and receiving recesses 110 are formed by the flange portion 105b of the adapter 105 and the annular recess 103b of the seal cover 103. Further, the flange portion 105b of the adapter 105 has through holes 105k extending therethrough in the axial direction and formed at positions corresponding to internally threaded holes 103h of the seal cover 103 (see FIG. 6C).

Further, as a modification B of the holders 9 according to the first embodiment, holders 209 shown in FIG. 6B are formed in a stadium shape as viewed in the screw insertion direction without a flange portion extending radially outward. Further, the holders 209 are cut out at opposite ends in a direction perpendicular to the radial direction of the seal cover 103, and receiving recesses 209e are formed in a rectangular parallelepiped shape which is open in a direction perpendicular to the radial direction of the seal cover 103. The seal cover and the adapter, to which the holders 209 according to the modification B are applied, have the same configuration as the seal cover 103 and the adapter 105 described above, and thus the description thereof is omitted. In addition, the phrase "cut out" means that it is not necessary to be actually cut out and manufactured and it is only necessary to have a cutout shape. The same applies to the followings.

Accordingly, the holders 109, 209 according to the modifications A, B are formed in a circular shape as viewed in the screw insertion direction and in a stadium shape as viewed in the screw insertion direction, respectively, and the holders 109, 209 are rotatable relative to the seal cover 103 and the adapter 105. Therefore, even when a torque is applied to the adapter 105, the holders 109, 209 receive the torque to be easily rotate, and the torque is less likely to be transmitted to the bolts 11, so that the bolts 11 can be prevented from loosening. In addition, installing/assembling the holders 9 to the receiving recesses 110 in the seal cover 103 can be easily performed.

Figure 7A:
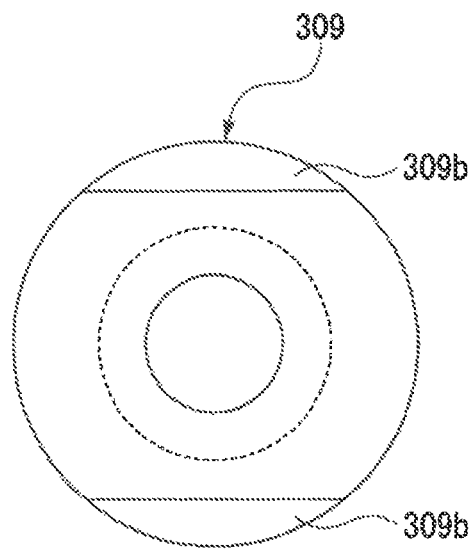
FIGS. 7A and 7B are bottom views showing configurations of holders according to modifications C and D of the first embodiment.

In addition, as a modification C of the holders 9 according to the first embodiment, holders 309 shown in FIG. 7A are formed in a circular shape in the screw insertion direction, and have respective flange portions 309b having a substantially semicircular shape formed corresponding to the radially inner side and the radially outer side of the seal cover 303. Receiving recesses 310 in the seal cover 303 are formed in a circular shape as viewed in the screw insertion direction corresponding to the shape of the holders 309 (see FIG. 7C).

Figure 7B:
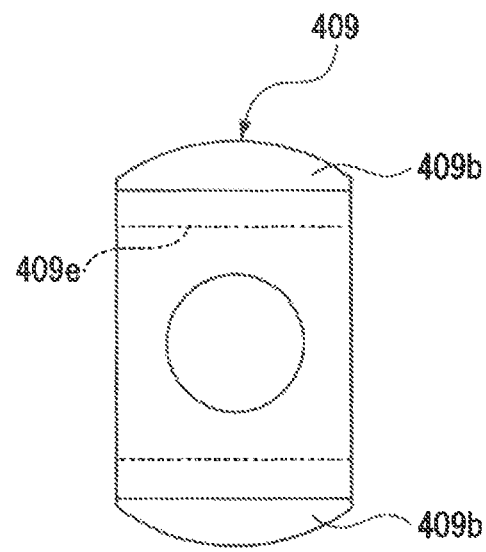
Figure 7C:
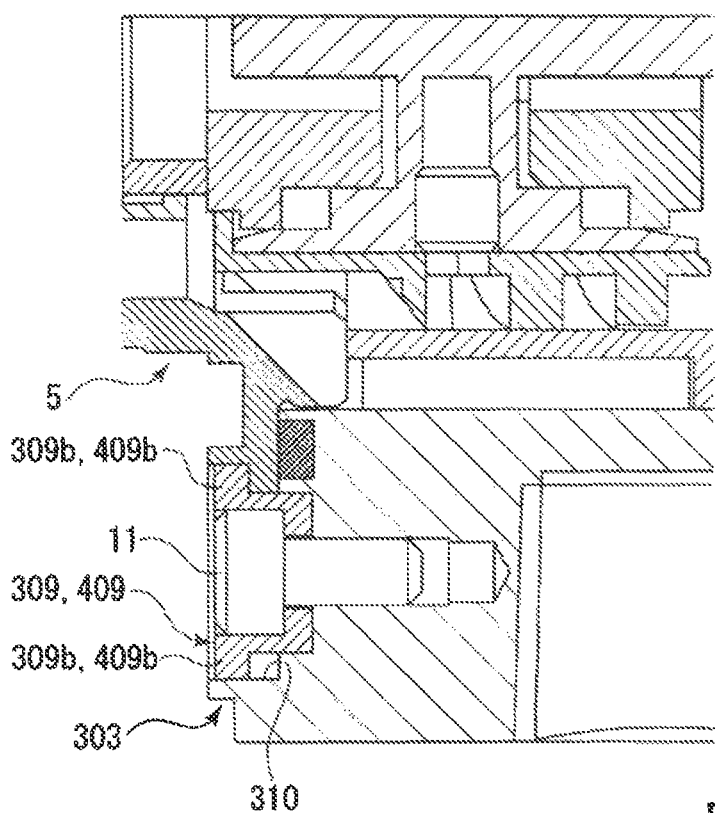
FIG. 7C is an enlarged sectional view showing a configuration for fixing the adapter by the holders according to the modifications C and D.

Further, as a modification D of the holders 9 according to the first embodiment, holders 409 shown in FIG. 7B are formed in a stadium shape as viewed in the screw insertion direction, and have respective flange portions 409b having a substantially semicircular shape formed corresponding to the radially inner side and the radially outer side of the seal cover 303. The holders 409 are cut out at opposite ends in a direction perpendicular to the flange portions 409b, and receiving recesses 409e are formed in a rectangular parallelepiped shape which is open in a direction perpendicular to the flange portions 409b. The seal cover, to which the holders 409 according to the modification D are applied, has the same configuration as the seal cover 303 described above, and thus the description thereof is omitted.

Figure 8A:
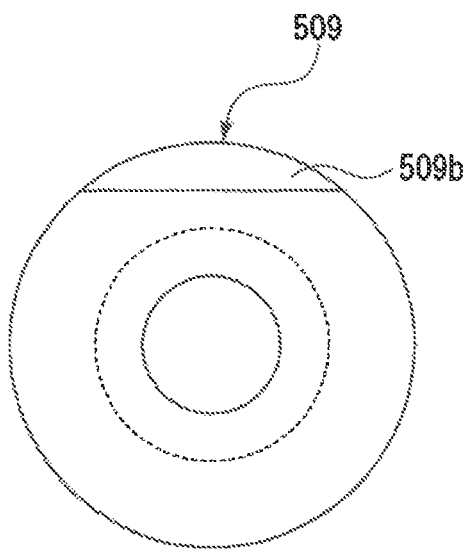
FIGS. 8A and 8B are bottom views showing configurations of holders according to modifications E and F of the first embodiment.

Further, as a modification E of the holders 9 according to the first embodiment, holders 509 shown in FIG. 8A are formed in a circular shape as viewed in the screw insertion direction, and flange portions 509b are formed corresponding to the radially inner side of a seal cover 503. Receiving recesses 510 in the seal cover 503 are formed in a circular shape as viewed in the screw insertion direction corresponding to the shape of the holders 509 (see FIG. 8C).

Figure 8B:
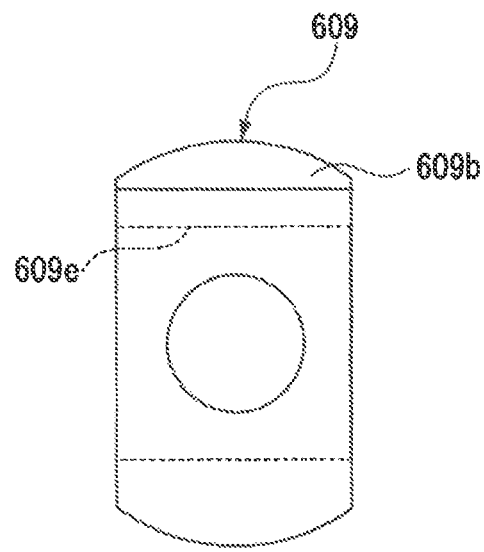
Figure 8C:
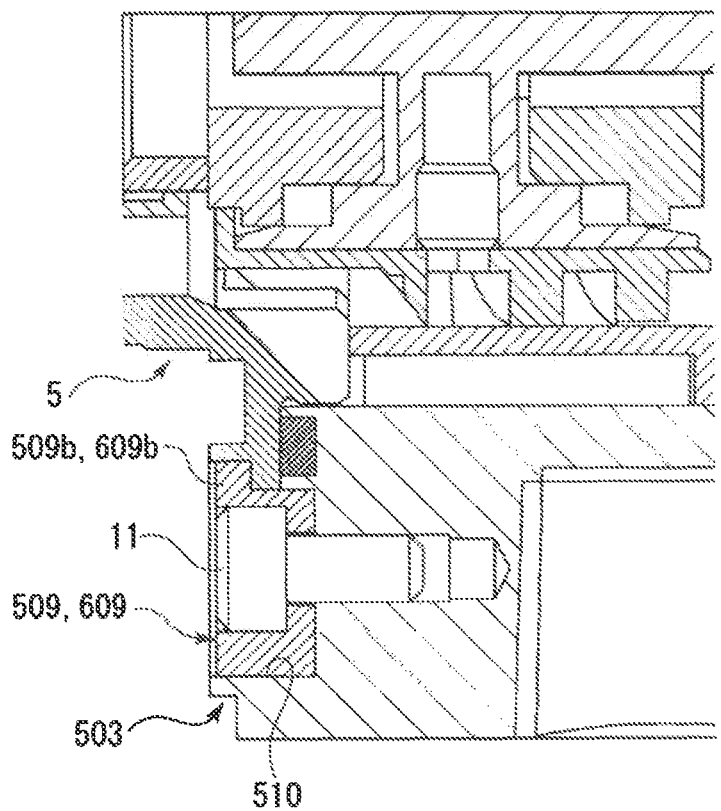
FIG. 8C is an enlarged sectional view showing a configuration for fixing the adapter by the holders according to the modifications E and F.

Further, as a modification F of the holders 9 according to the first embodiment, holders 609 shown in FIG. 8B are formed into a stadium shape as viewed in screw insertion direction, and have respective flange portions 609b having a substantially semicircular shape formed corresponding to the radially inner side of the seal cover 503. The holders 609 are cut out at opposite ends in a direction perpendicular to the flange portions 609b, and receiving recesses 609e are formed in a rectangular parallelepiped shape which is open in a direction perpendicular to the flange portions 609b. The seal cover, to which the holders 609 according to the modification F are applied, has the same configuration as the seal cover 503 described above, and thus the description thereof is omitted.

Accordingly, the shapes of the holders 309, 409, 509, 609 and the receiving recesses 310, 510 in the seal covers 303, 503 are formed in a circular shape as viewed in the screw insertion direction or in a stadium shape as viewed in the screw insertion direction, and are fitted to each other. Therefore, even when a torque is applied to the adapter 5 with the holders 309, 409, 509, 609 fitted into the receiving recesses 310, 510 in the seal covers 303, 503, the torque of the holders 309, 409, 509, 609 is regulated. Thus, no torque is transmitted to the bolts 11, so that the bolts 11 can be more reliably prevented from loosening. In addition, installing/assembling the holders 309, 409, 509, 609 to the receiving recesses 310, 510 in the seal covers 303, 503 can be easily performed.

Figure 9A:
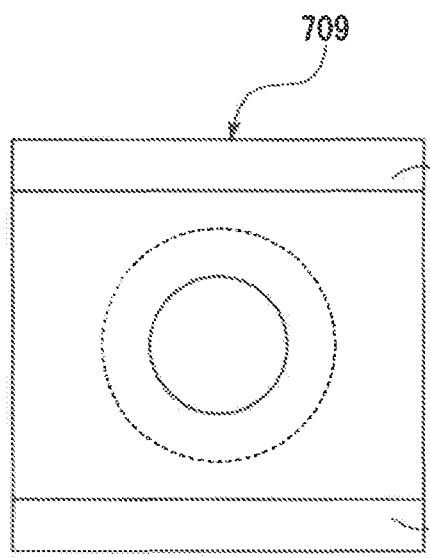
FIGS. 9A and 9B are bottom views showing configurations of holders according to modifications G and H of the first embodiment.

Further, as a modification G of the holders 9 according to the first embodiment, holders 709 shown in FIG. 9A are formed in a square as viewed in the screw insertion direction, and respective flange portions 709b are formed corresponding to the radially inner side and the radially outer side of a seal cover 703. Receiving recesses 710 in the seal cover 703 are formed in a square as viewed in the screw insertion direction corresponding to the shape of the holders 709 (see FIG. 9C).

Figure 9B:
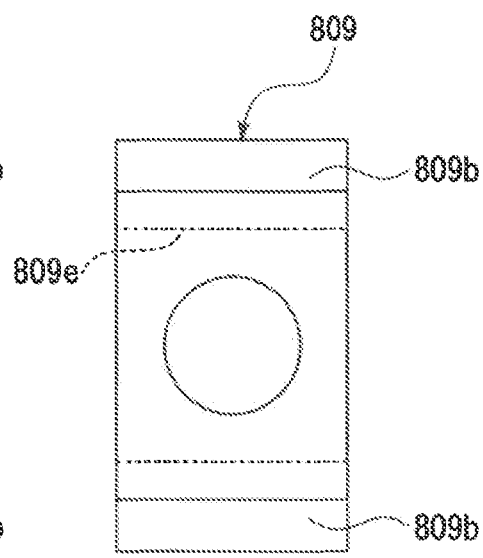
Figure 9C:
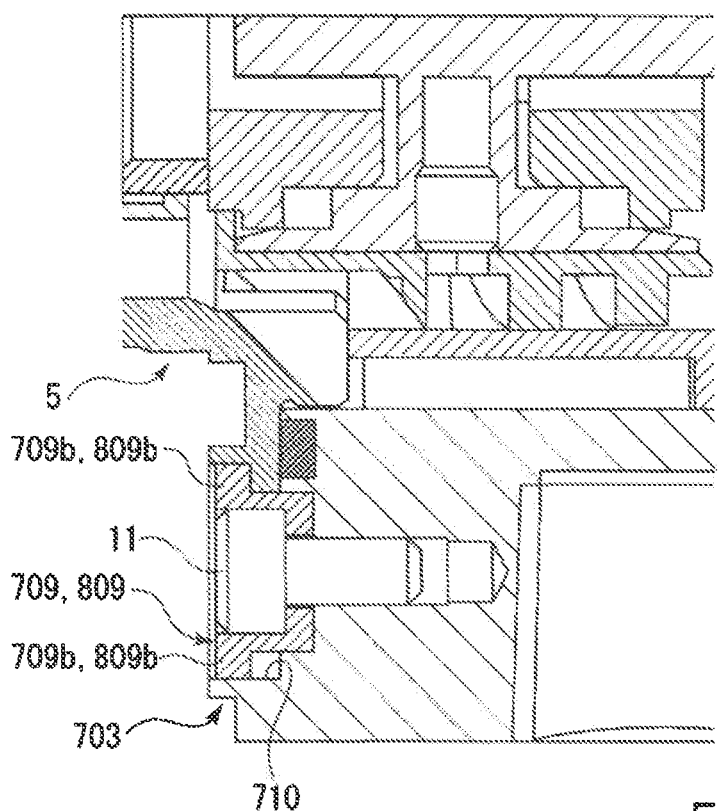
FIG. 9C is an enlarged sectional view showing a configuration for fixing the adapter by the holders according to the modifications G and H.

Further, as a modification H of the holders 9 according to the first embodiment, holders 809 shown in FIG. 9B are formed in a rectangular shape as viewed in the screw insertion direction, and respective flange portions 809b are formed corresponding to the radially inner side and the radially outer side of the seal cover 703. Receiving recesses 809e of the holders 809 are formed in a rectangular parallelepiped shape which is open in a direction perpendicular to the flange portions 809b. The seal cover, to which the holders 809 according to the modification H are applied, has the same configuration as the seal cover 703 described above, and thus the description thereof is omitted.

Figure 10:
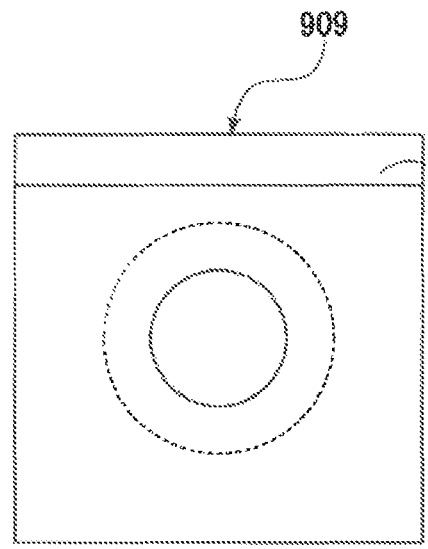
FIGS. 10A and 10B are bottom views showing configurations of holders according to modifications I and J of the first embodiment.
FIG. 10C is an enlarged sectional view showing a configuration for fixing the adapter by the holders according to the modifications I and J.

Further, as a modification I of the holders 9 according to the first embodiment, holders 909 shown in FIG. 10A are formed in a square viewed in the screw insertion direction, and flange portions 909b is formed corresponding to the radially inner side of a seal cover 903. Receiving recesses 910 in the seal cover 903 are formed in a square viewed in the screw insertion direction corresponding to the shape of the holders 909 (see FIG. 10C).

Figure 10B:
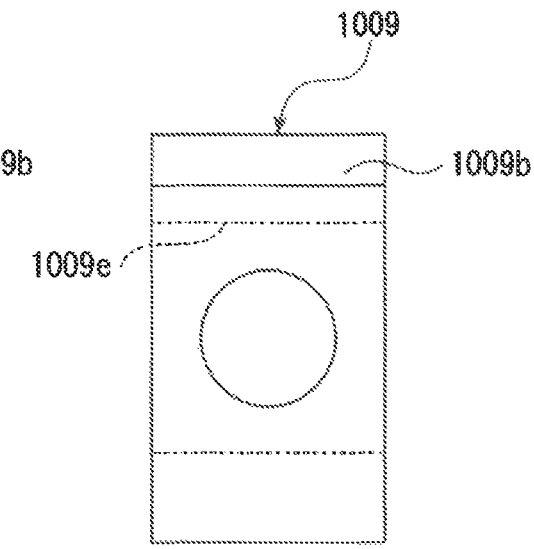
Figure 10C:
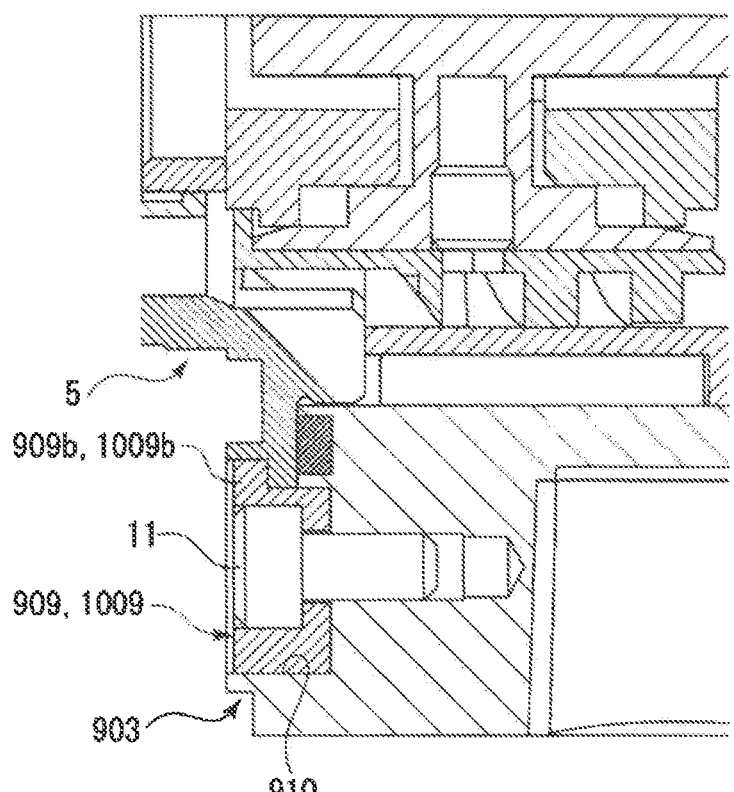

Further, as a modification J of the holders 9 according to the first embodiment, holders 1009 shown in FIG. 10B are formed in a rectangular shape as viewed in the screw insertion direction, and flange portions 1009b are formed corresponding to the radially inner side of the seal cover 903. Receiving recesses 1009e of the holders 1009 are formed in a rectangular parallelepiped shape which is open in a direction perpendicular to the flange portions 1009b. The seal cover, to which the holders 1009 according to the modification J are applied, has the same configuration as the seal cover 903 described above, and thus the description thereof is omitted.

Further, as a modification K of the holders 9 according to the first embodiment, holders 1109 shown in FIG. 11A are formed in a square as viewed in a screw insertion direction without a flange portion extending radially outward. A seal cover 1103 has an annular recess 1103b formed up to the radially outer side. An adapter 1105 has a flange portion 1105b extending up to the radially outer side of the annular recess 1103b of the seal cover 1103, and receiving recesses 1110 are formed by the flange portion 1105b of the adapter 1105 and the annular recess 1103b of the seal cover 1103. In addition, the flange portion 1105b of the adapter 1105 has through holes 1105k extending therethrough in the axial direction and formed at positions corresponding to internally threaded holes 1103h of the seal cover 1103 (see FIG. 11C).

Further, as a modification M of the holders 9 according to the first embodiment, holders 1209 shown in FIG. 11B are formed in a rectangular shape as viewed in a screw insertion direction without a flange portion extending radially outward. Receiving recesses 1209e of the holders 1209 are formed in a rectangular parallelepiped shape which is open in a lateral direction. The seal cover and the adapter, to which the holders 1209 according to the modification M are applied, have the same configuration as the seal cover 1103 and the adapter 1105 described above, and thus the description thereof is omitted.

Accordingly, the holders 709, 809, 909, 1009, 1109, 1209 and the receiving recesses 710, 910, 1110 in the seal covers 703, 903, 1103 are formed in a non-circular shape as viewed in the screw insertion direction and are fitted to each other. Therefore, even when a torque is applied to the adapters 5, 1105 with the holders 709, 809, 909, 1009, 1109, 1209 fitted into the receiving recesses 710, 910, 1110 in the seal covers 703, 903, 1103, the torque of the holders 709, 809, 909, 1009, 1109, 1209 is regulated. Thus, no torque is transmitted to the bolts 11, so that the bolts 11 can be more reliably prevented from loosening. The shape of the holders and the receiving recesses in the seal covers formed in a non-circular shape as viewed in the screw insertion direction has been described as a square shape, however, is not limited to this. They may be formed as a polygon such as a hexagon and an octagon.

Second Embodiment

Next, a mechanical seal according to a second embodiment will be described with reference to FIG. 12. The same components as those shown in the above embodiment are denoted by the same reference numerals, and redundant description will be omitted.

A mechanical seal 1301 according to the second embodiment will be described. As shown in FIG. 12, in the present embodiment, the mechanical seal 1301 is provided between the rotary shaft 2 of rotating equipment such as a pump and a compressor, and a seal cover 1303, and mainly includes the annular rotating seal rings 20, 21 fixed to the rotary shaft 2 via a sleeve 1304 and the annular stationary seal rings 30, 31 fixed to the seal cover 1303 and an adapter 1305. The stationary seal rings 30, 31 are, respectively, biased in the axial direction by the metal bellows members 60, 61, so that the sliding surfaces 20a, 21a of the rotating seal rings 20, 21 and the sliding surfaces 30a, 31a of the stationary seal rings 30, 31 closely slide with each other to allow the sealed fluid to be sealed. The mechanical seal 1301 according to the present embodiment is configured as a so-called tandem mechanical seal in which the rotating seal ring 20 and the stationary seal ring 30 on the atmosphere side, and the rotating seal ring 21 and the stationary seal ring 31 on the equipment interior side face in the same direction.

In FIG. 12, the holders 9 described in the first embodiment are used for fixing the adapter 1305 to the seal cover 1303 by holders. However, the present invention is not limited to this. As holders, the configuration of the modifications A to M of the holders 9 according to the first embodiment described above may be applied. Needless to say, the shapes of the seal cover and the adapter are changed corresponding to the configuration of the holders to be applied.

Although the embodiments of the present invention have been described above with reference to the drawings, the specific configuration is not limited to these embodiments.

For example, in the embodiments described above, the holders are described as being inserted and fitted into the receiving recesses formed in the seal cover or into the receiving recesses formed by the seal cover and the flange portion of the adapter. There is no need to provide a receiving recess in the seal cover or in the flange portion of the adapter.

Further, holders are not limited to four holders equiangularly arranged, and a plurality of holders only needs to be arranged in the circumferential direction.

Further, the adapter may be fixed to the seal cover from the atmosphere side.

Further, the configuration for fixing the adapter by the holders described in the embodiments described above may be applied to a single mechanical seal.

REFERENCE SIGNS LIST 1 mechanical seal
2 rotary shaft
3 seal cover
3f internally threaded hole (threaded hole)
4 sleeve
5 adapter
5b flange portion
5e first outer peripheral surface
5f annular surface portion
5g second outer peripheral surface
5h annular stepped portion
7 squeeze packing 8 baffle
9 holder
9a cylindrical portion
9b flange portion (outer flange portion, contact portion)
9c bottom portion (inner flange portion)
9d through hole
9e receiving recess
10 receiving recess
10a bottom surface portion
10b first side surface portion
10c outer edge surface portion
10d second side surface portion
11 bolt
11a body part
11b head part
20,21 rotating seal ring
20a,21a sliding surface
30,31 stationary seal ring
30a,31a sliding surface
60,61 bellows member

The invention claimed is:

1. A mechanical seal comprising:
a rotating seal ring which rotate together with a rotary shaft;
a stationary seal ring,
an adapter which holds the stationary seal ring, the adapter being fixed to a seal cover by bolts; and
a plurality of holders provided with through holes, a body part of each of the bolts passing through each of the through holes and being screwed into each of threaded holes formed in the seal cover, the plurality of holders being arranged so as to surround the rotary shaft and brought into contact with the adapter in axial directions of the bolts,
wherein the contact portions of the holders with the adapter are outer flange portions formed in the holders so as to extend radially outward,
wherein the holders have inner flange portions formed around the through holes, each of the inner flange portions having a first end surface brought into contact with each of bottom portions of head parts of the bolts and a second end surface brought into contact with the seal cover or the adapter, the first end face and the second end face being opposed to each other in the axial direction,
the inner flange portion of each of the holders is pressed toward the seal cover by screwing the bolts into threaded holes and as a result the adapter is fixed to the seal cover though the holders, and
the adapter has portions interposed between radially inner side parts of the outer flange portions and the seal cover, gaps are formed between radially outer side parts of the outer flange portions and the seal cover.

2. The mechanical seal according to claim 1, wherein the holders are provided with receiving recesses for receiving the head parts of the bolts.

3. The mechanical seal according to claim 1, wherein the seal cover is provided with receiving recesses for receiving the holders.

4. The mechanical seal according to claim 3, wherein each of the holders and each of the receiving recesses in the seal cover are formed in a circular shape as viewed in a screw insertion direction of the bolts and are fitted to each other.

5. The mechanical seal according to claim 3, wherein each of the holders and each of the receiving recesses in the seal cover are formed in a non-circular shape as viewed in a screw insertion direction of the bolts and are fitted to each other.

6. The mechanical seal according to claim 1, wherein a squeeze packing is provided so as to be at least partially positioned between the holders and the seal cover in the screw insertion direction of the bolts.

* * * * *